United States Patent [19]

Kaufmann

[11] 4,213,676
[45] Jul. 22, 1980

[54] LIQUID CRYSTAL DISPLAY FOR REFLECTION OPERATION WITH A GUEST-HOST LIQUID CRYSTAL LAYER AND METHOD OF MAKING

[75] Inventor: Meinolph Kaufmann, Fislisbach, Switzerland

[73] Assignee: BBC Brown Boveri & Company Limited, Baden, Switzerland

[21] Appl. No.: 817,009

[22] Filed: Jul. 19, 1977

[30] Foreign Application Priority Data

Aug. 10, 1976 [CH] Switzerland .................... 10164/76

[51] Int. Cl.² .............................................. G02F 1/13
[52] U.S. Cl. .................................. 350/336; 350/338; 350/344
[58] Field of Search ............... 350/334, 336, 338, 339, 350/344, 349

[56] References Cited

U.S. PATENT DOCUMENTS

| | | | |
|---|---|---|---|
| 3,892,471 | 7/1975 | Biermann et al. | 350/336 |
| 4,023,890 | 5/1977 | Shirasu et al. | 350/336 |
| 4,036,550 | 7/1977 | Yih | 350/336 X |
| 4,037,926 | 7/1977 | Kreuger | 350/336 |

*Primary Examiner*—Edward S. Bauer
*Attorney, Agent, or Firm*—Oblon, Fisher, Spivak, McClelland & Maier

[57] ABSTRACT

A liquid crystal display for reflection operation with a guest-host liquid crystal layer disposed between two cell plates and respective front and rear electrodes, and with a diffusely divergent reflector integrated in the interior of the cell, at least the front side of the cell plate and the front electrode being transparent. The rear electrode and its supply comprise thick layers, and the reflector consists of metal parts insulated against one another and applied to the rear electrode and to the inner surface of the rear cell plate. Also disclosed is a method of producing a liquid crystal display including the steps of printing in a first screen printing process a thick layer having metal parts and a binder and having the configuration of the back electrode and its supply line on the inner surface of the rear cell plate, applying in the subsequent visual region in a second screen printing process a reflector layer with mutually insulated metal parts and a binder to the thick layer and to the inner face of the rear cell plate, printing in a third screen printing process a glass solder impression on the edges of the inner surface of the rear cell plate, mounting a front cell plate having a transparent front electrode disposed on its inner face on the glass solder impression, glass soldering the individual layers formed by the first, second and third printing processes and the front cell plate, and curing the individual layers and the front cell plate.

8 Claims, 4 Drawing Figures

LIQUID CRYSTAL DISPLAY FOR REFLECTION OPERATION WITH A GUEST-HOST LIQUID CRYSTAL LAYER AND METHOD OF MAKING

BACKGROUND OF THE INVENTION

1. Field of the Invention

The present invention relates to a liquid crystal display for reflection operation with a guest-host liquid crystal layer disposed between two cell plates and respective front and rear electrodes, and with a diffusely divergent reflector integrated in the interior of the cell, at least the front side of the cell plate and the front electrode being transparent. The invention also relates to a method of producing this liquid crystal display.

2. Description of the Prior Art:

The principle of cholesterinic guest-host liquid crystal displays is known (Appl. Phys. Lett. 13, 91, 1968) and has already been used for constructing electro-optic devices (see DT-OS 2,410,557). From Journal of Applied Physics, Vol. 45, 1974, p. 4718–4723 a liquid crystal display device is known which utilizes pleochroic dyes (guest) and cholestorinic liquid crystal mixtures (host). This liquid crystal display is operated by reflection and has excellent brightness since external polarizers are not used. This publication explains the basic principle of the guest-host effect (for example, FIG. 2) and gives information regarding suitable liquid crystal mixtures and dyes and measurement results obtained by experiment.

Although it has been shown that in liquid crystal displays having a guest-host liquid crystal layer it is possible to dispense with expensive polarizers, it has not hitherto been possible for this type of display to compete with the successful nematic rotary cells. It has been found that in guest-host displays operated by reflection, reading parallax occurs through a reflector disposed behind the liquid crystal cell. This has a particularly disturbing effect in relatively small displays in which the width of the electrode elements is smaller than or comparable to the thickness of the cell plates used. Dimension ratios of this kind often occur in displays which are intended for use in wristwatches or digital voltmeters.

It therefore appears obvious to integrate the reflector in the interior of the cell. Unfortunately, however, new disturbing effects then occur, particularly in alphanumeric displays. In this case the integrated electrically conductive reflector performs the function of a rear electrode and results in not only the activated electrode elements themselves but also the connecting lines leading to them becoming visible. Since for technological and electrical reasons there is a limit to the narrowness of these connecting lines, this disturbing effect prevents the appropriate use of displays of this kind.

As had already been done in the production of nematic rotary cells, both the front and the rear electrode have hitherto also been made by a thin film technique for guest-host liquid crystal displays. Thus, for example, cell plates made of glass were vapor-coated on one side in a high vacuum with a conductive transparent layer of $SnO_2$ or $In_2O_3$ of a thickness of 2000–5000 Å. On these cell plates, referred to as conductor glasses, the electrode pattern corresponding to the nature of the characters to be displayed and to the activation system of the display was then printed on the coating side with acid-resistant protective lacquer by a screen printing process. This was followed by an etching process, for example, etching in a solution of HCl or $H_3PO_4$, in which the excess parts of the coating were etched away and the coating cleaned by rinsing a number of times in water.

SUMMARY OF THE INVENTION

Accordingly, one object of this invention is to provide a novel guest-host liquid crystal display which is feasible for mass production.

Another object is to provide a liquid crystal display in which electrode supply lines are not noticeable.

A further object is to develop an inexpensive process to integrate the production of the rear electrodes in a liquid crystal display into the overall display production process.

These and other objects are attained according to this invention by providing a liquid crystal display in which the rear electrode and its supply comprise thick layers, and the reflector consists of metal parts insulated against one another and applied to the rear electrode and to the inner surface of the rear cell plate. Furthermore, these and other objects are attained in a method of producing a liquid crystal display comprising the steps of printing in a first screen printing process a thick layer comprising metal parts and a binder and having the configuration of the back electrode and its supply line on the inner surface of the rear cell plate, applying in the subsequent visual region in a second screen printing process a reflector layer including mutually insulated metal parts and a binder to the thick layer and to the inner face of the rear cell plate, printing in a third screen printing process a glass solder impression on the edges of the inner surface of the rear cell plate, mounting a front cell plate having a transparent front electrode disposed on its inner face on the glass solder impression, glass soldering in a glass soldering process the individual layers formed by the first, second and third printing processes and the front cell plate, and curing the individual layers and the front cell plate at a maximum temperature of 500° C. and for a time of from 0.5 to 1.5 hours.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
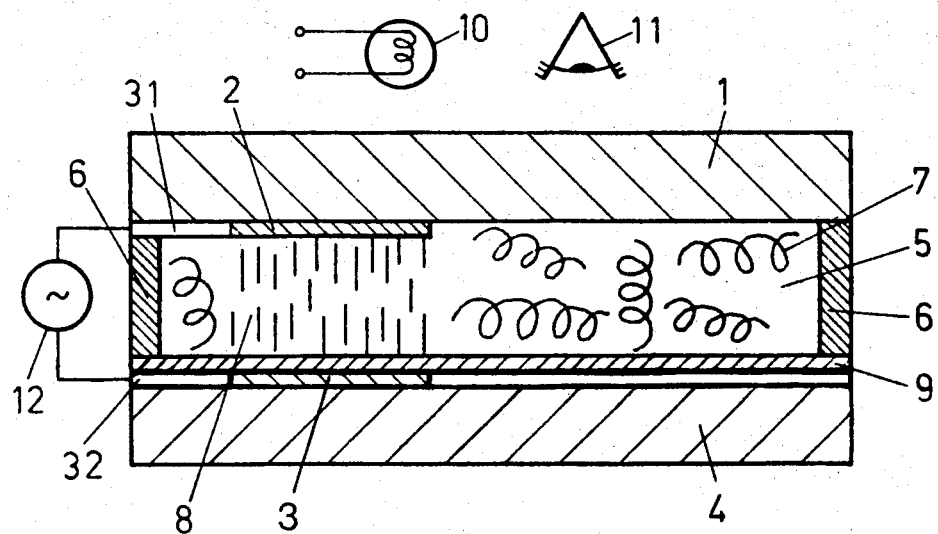
FIG. 1 is an example of the basic principle of a guest-host liquid crystal display.

Referring now to the drawings, wherein like reference numerals designate identical or corresponding parts throughout the several views, and more particularly to FIG. 1 thereof, the guest-host liquid crystal display consists of a front cell plate 1, a front electrode 2 also disposed on the front side, and a back electrode 3 mounted on a rear cell plate 4. Between the two cell plates 1, 4 is disposed a liquid crystal layer 5 which is tightly closed at the edges by spacers 6. The liquid crystal layer 5 has a light-absorbing, helically wound structure 7, which by the application of an electric field, for example an alternating current source 12, to the supply lines 31 and 32 of the electrodes 2 and 3 can be converted into a uniform structure 8 which is either non-absorbent or only partially absorbent to light.

During operation the liquid crystal display is illuminated at the front side, this being represented by a light source 10. A viewer 11 is also situated at the front side. The light falling on the liquid crystal display passes through the region of the non-absorbent structure 8 of the liquid crystal layer 5 and is diffusely reflected by a reflector 9 towards the viewer 11.

The liquid crystal layer 5 has a thickness of 15 $\mu$ and consists of a nematic base substance having positive dielectric anisotropy, for example a mixture in the weight ratio 1:1:1 of P-butoxy, P-hexyloxy, and P-octanoyloxybenzylidene-P-aminobenzonitrile, which base substance contains admixtures of about 5 to 15% of an optically active substance, for example cholesteryl benzoate, and about 0.2 to 1% of the pleochroitic dye, for example indopaenol blue. Mixtures of this kind are known (J. of Appl. Phys., 45, 1974, p. 4718–4723) and can be replaced by other mixtures having the same or similar physical properties.

Figure 3:
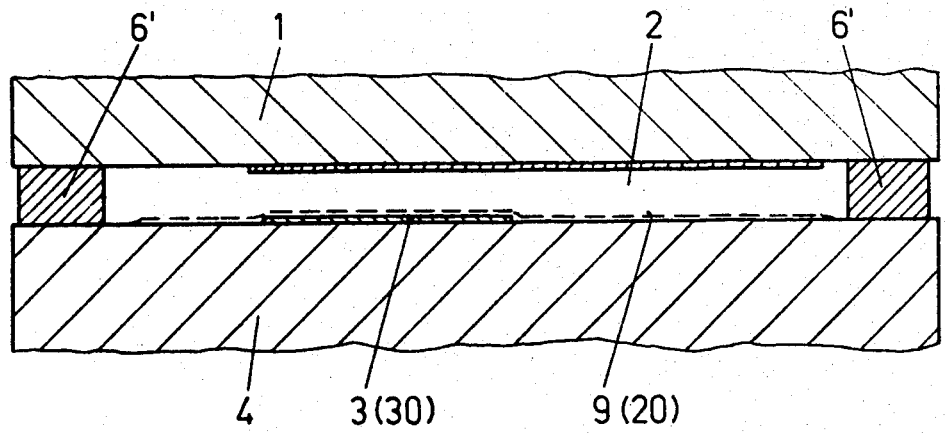
FIG. 3 is a view of an assembled liquid crystal display with the rear cell plate of FIG. 2, after the glass soldering process.

A liquid crystal display according to the invention is seen in FIG. 3. The back electrode 3 consisting of individual metal parts 30 is covered over the entire visual region by the reflector 9 consisting of metal parts 20 isolated from one another. Since the individual scale-like metal parts 20 have lengths of about 2 to 10 $\mu$m and in addition are insulated against one another, no short-circuits occur between the individual electrode segments and their supply lines. The alternating voltage necessary for activation, 12 volts 32 Hz, is introduced into the liquid crystal layer in the region of the back electrode by way of the metal parts 20. No undesirable side-effects, such as activated supply lines or partially activated subsidiary regions, etc., now occur.

The metal parts 30 of the back electrode may be made of aluminum or of precious metals, such as silver, palladium-silver, or gold.

The reflector 9 has a sheet resistivity of about $10^7 \Omega$ per square, while an oxide coating suffices to insulate the aluminum metal particles 20 from one another.

In order to increase the abrasive resistance of the reflector 9, an addition of from 1 to 5% weight of glass solder powder of a grain size of from 0.5 to 5 $\mu$m has given good results.

The addition of non-conductive particles 29 of $CeO_2$, $MgO$, $SiO_2$, $TiO$, $TiO_2$, $ZrO_2$, $Al_2O_3$, whose largest dimension corresponds at least approximately to the desired distance between the oppositely disposed cell plates 1, 4 produces liquid crystal displays of great plane parallelism and reproducible thickness. These particles 29, of which a few will be sufficient for each liquid crystal cell, do not bring about any visible modification of the optical properties of the display. Glass fibers of corresponding diameter and of a length of from 20 to 100 $\mu$m are also suitable for the same purpose.

Two methods have given good results for the production of a cell plate 4 coated in accordance with the invention.

Method A

In a first conventional screen printing process $S_I$ an electrode pattern, corresponding to the nature of the characters to be displayed and to the activating system of the display, is printed in the form of a thick layer of a thickness of from 5 to 15 $\mu$m on a carefully cleaned rear cell plate 4 (FIG. 2) of glass or ceramic material, or the like.

For this first screen printing process $S_I$ an aluminum-bronze ink consisting of metal parts 30 (aluminum pigments) and binder has been found successful. The weight ratio of metal parts 30 to binder used in this mixture is 1:5, (weight ratios of from 1:2 to 1:10 however, have the same effect). A solution consisting of one part by volume of nitrocellulose and one part by volume of amyl acetate is, for example, suitable as binder.

The cell plate 4 printed in this manner is then dried in the air and then subjected for 30 minutes to a heating process at 530° C. In this heating process the binder burns without leaving a residue, the metal parts 30 sink onto the cell plate 4, conglomerate to form a layer of a thickness of from 1 to 3 $\mu$m, and finally sinter together to form electrically conductive contacts.

The previously insulating thick layer has a resistance of about 100 to 200 $\Omega$-cm, so that it can be used as a rear electrode for a liquid crystal display.

In a second subsequent screen printing process $S_{II}$ the rear electrode 3 and the inner surface of the rear cell plate 4 are printed in the visual region with aluminum-bronze ink to a thickness of 3 to 20 $\mu$m.

Figure 2:
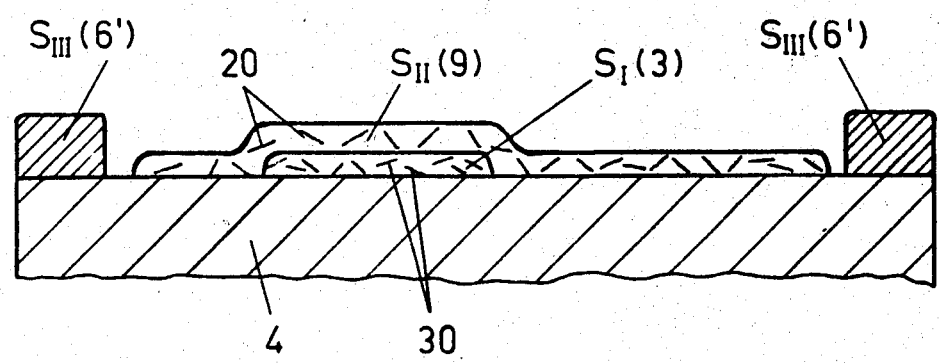
FIG. 2 is a view of a rear cell plate coated in accordance with the invention before assembly.

The aluminum-bronze ink mixture used in the first screen printing process $S_I$ also gives good results in the second printing process $S_2$. Since they are used to form the reflector 9, however, the aluminum pigments are of a mean length of from 2 to 10 $\mu$m and assume the function of metal parts 20 insulated against one another (FIGS. 2 and 3). The individual insulated metal parts 20 consisting of aluminum pigments are coated with an insulating oxide layer of a thickness of from 10 to 100 Å, which forms in a normal atmosphere.

After intermediate drying at 150° C. for about 5 minutes, a glass solder impression 6' of a thickness of 15 $\mu$m is applied along the outer edges of the cell plate 4 in a third screen printing process $S_{III}$, and intermediate drying is effected, likewise at 150° C. for about 5 minutes.

The rear cell plate 4 has thus been prepared to such an extent that the front cell plate 1, provided with the front electrode 2 by the conventional thin film technique, can be mounted on the glass solder impression 6'. After the adjustment of the cell plates 1 and 4 in accordance with the shape of the electrodes 2 and 3, a glass soldering process, known from the production of nematic rotary cells, is effected in a soldering oven at a temperature of from 400 to 500° C. and over a period of from 0.5 to 1.5 hours.

During this glass soldering process the binder still present from the second screen printing process $S_{II}$ is burned, once again without leaving a residue, but without destroying the mutually insulating oxide layer on the aluminum pigments.

In the soldered liquid crystal cell (FIG. 3) the reflector 9 has a sheet resistivity of about $10^7$ ohms per square. The sheet thickness of the reflector 9 amounts to only from 2 to 5 $\mu$ because the individual metal parts 20 now lie close against one another.

After the liquid crystal has been introduced into the liquid crystal cell, the latter is sealed with a metal solder, as is also customary in the production of rotary cells, and is thus ready for operation.

As already illustrated in FIG. 1, the liquid crystal layer 5 is activated by means of an alternating voltage source 12 applied to the electrodes 2 and 3. As a consequence of the fusing of the aluminum pigments the back electrode 3 has good conductivity. The reflector 9 consisting of the metal parts 20 insulated against one another is on the other hand non-conductive. Because of the insulated metal parts 20 lying close to one another, however, good alternating voltage coupling is achieved in a direction normal to the cell plates 1, 4 to the back electrode 3 and to the liquid crystal layer 5, so that the properties required of the liquid crystal display are achieved.

Because of its rough surface consisting of the individual insulated metal parts 20 the reflector 9 is diffusely divergent. This action is achieved without surface treatment of the cell plate 4 and without the cost such surface treatment would entail.

Method B

Method B differs from method A in that screen printing process is performed with palladium-silver or gold-bronze ink instead of aluminum-bronze ink. Also the single glass soldering process simultaneously serves as a heat treatment in the production of the back electrode 3 and of the reflector 9, and is all that is required.

The first screen printing process $S_I$ is accordingly carried out with precious metal pigments instead of aluminum pigments. Because of the higher density compared with aluminum pigments, a mixture ratio of precious metal pigment to binder of from 2:1 to 1:2 is necessary. If these precious metal pigments are in flare form, the lower ratio is already sufficient. This first screen printing process $S_I$ is followed by the screen printing processes $S_{II}$ and $S_{III}$ in the manner described in method A.

Method B thus provides the advantage that the screen printing processes $S_I$ and $S_{II}$ can be carried out one after the other without a time-consuming intermediate heating process. This advantage is however, obtained at the cost of a higher price for material for the precious metal pigments.

Figure 4:
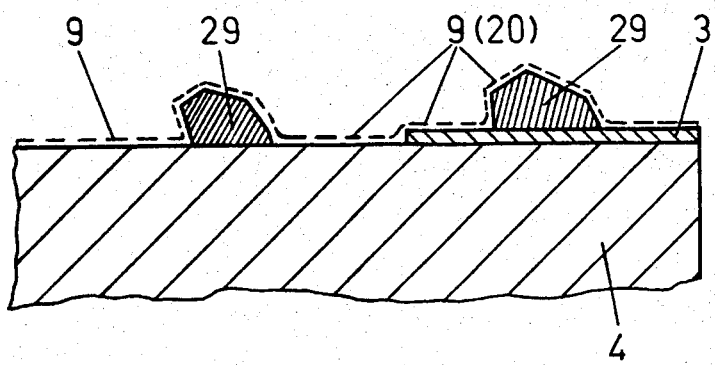
FIG. 4 is a diagrammatical section of a rear cell plate with non-conductive particles introduced in the second screen printing process.

In both methods increased resistance to abrasion can be given to the coatings by adding from 1 to 5% of glass solder powder of a grain size of about 1 $\mu$m in the first and second screen printing processes $S_I$, $S_{II}$. In addition, non-conductive particles 29 can be added to the second or third screen printing process $S_{II}$ or $S_{III}$, these particles being rearranged by the insulated metal parts 20 after the glass soldering process, as shown diagrammatically in FIG. 4, and assuming the function of spacers between the cell plates 1 and 4. Since the particles 29 are added in a very low concentration, since only a few particles are sufficient for each liquid crystal cell, and since these particles are non-conductive, the optical properties of the display are not disturbed.

Non-conductive particles 29 of $Al_2O_3$ or $SiO_2$ have given good results; particles 29 of $CeO_2$, $MgO$, $TiO_2$, $ZrO_2$ are, however, also utilizable for the same purpose. The largest dimension of the particles 29 amounts to 15 $\mu$m, which corresponds to the desired spacing of the cell plates 1 and 4. The shape of the particles is immaterial; glass fibers of a length of from 20 to 100 $\mu$m and a diameter of 12 $\mu$m have also been found satisfactory for the same purpose.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A liquid crystal display for reflection operation, including a guest-host liquid crystal layer disposed between front and rear cell plates and respective front and back electrodes, and a diffuse reflector integrated in the interior of the cell, at least said front cell plate and said front electrode being transparent, wherein:
    said back electrode and its supply line comprise a screen printed layer of ink comprising metal particles and a binder sintered in a heating process to form an electrically conductive sintered layer having a thickness of 1–3 $\mu$m; and
    said reflector comprises insulated metal particles applied to said back electrode and the inner surface of said rear cell plate.

2. A liquid crystal display according to claim 1, wherein:
    said metal particles of said ink comprise a metal from the group consisting of silver, palladium-silver, or gold.

3. A liquid crystal display according to claim 1, wherein:
    said reflector has a sheet resistivity of $10^7 \Omega$ per square.

4. A liquid crystal display according to claim 1, wherein:
    said reflector comprises metal particles insulated by oxide layers.

5. A liquid crystal display according to claim 1, wherein:
    said reflector further comprises from 1 to 5% by weight of glass solder powder of a grain size of from 0.5 to 5 $\mu$m added to said reflector.

6. A liquid crystal display according to claim 4, wherein said reflector further comprises:
    non-conductive particles added to the insulated metal particles, the largest dimension of the said non-conductive particles corresponding approximately to the desired spacing between said front and back cell plates.

7. A liquid crystal display according to claim 6 wherein said non-conductive particles comprise:
    oxides from the group consisting of $CeO_2$, $MgO$, $SiO_2$, $SiO$, $TiO$, $TiO_2$, $Z_1O_2$, $Al_2O_3$, or mixtures thereof.

8. A liquid crystal display according to claim 1, wherein said reflector further comprises:
    glass fibers of a length of from 20 to 100 $\mu$m and of a thickness corresponding to the desired spacing between said front and back cell plates.

* * * * *